Sept. 30, 1969     D. G. WOLFE ET AL     3,469,779
ELECTRICAL THERMOSTAT AND PARTS THEREFOR OR THE LIKE
Filed Oct. 3, 1967     3 Sheets-Sheet 1
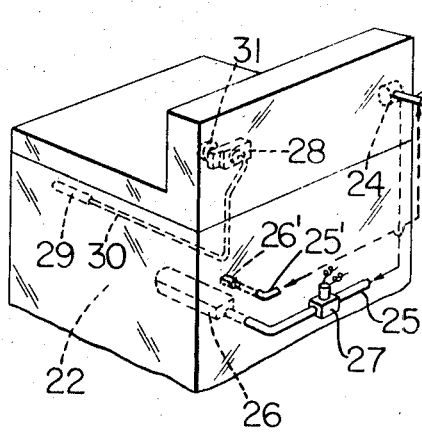
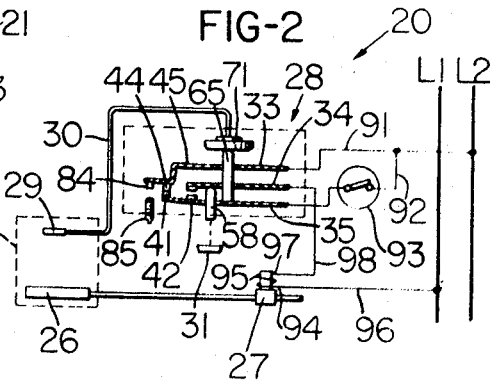
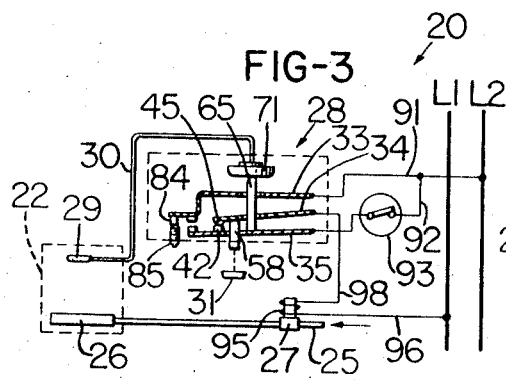
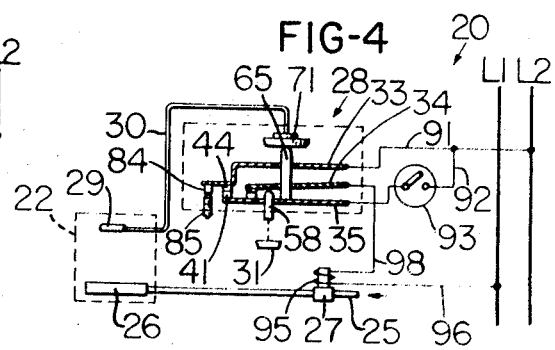
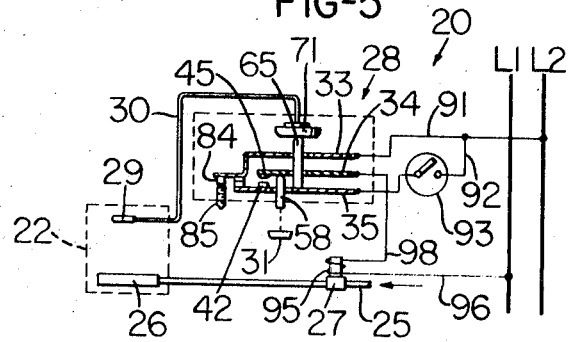
INVENTORS
DENIS G. WOLFE
FRANCIS S. GENBAUFFE
BY   GERALD H. EICHER
THEIR ATTORNEYS

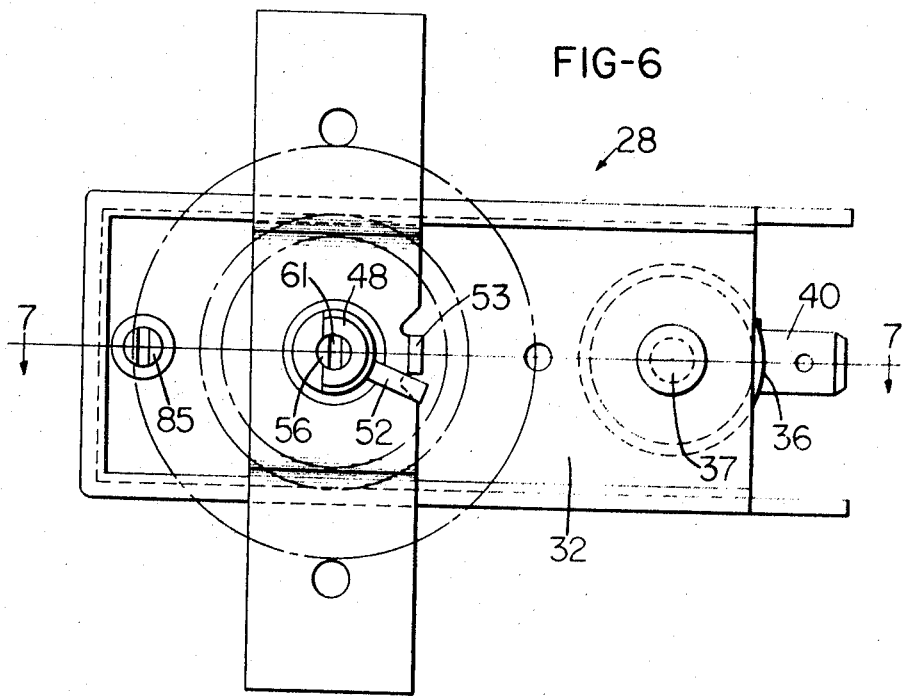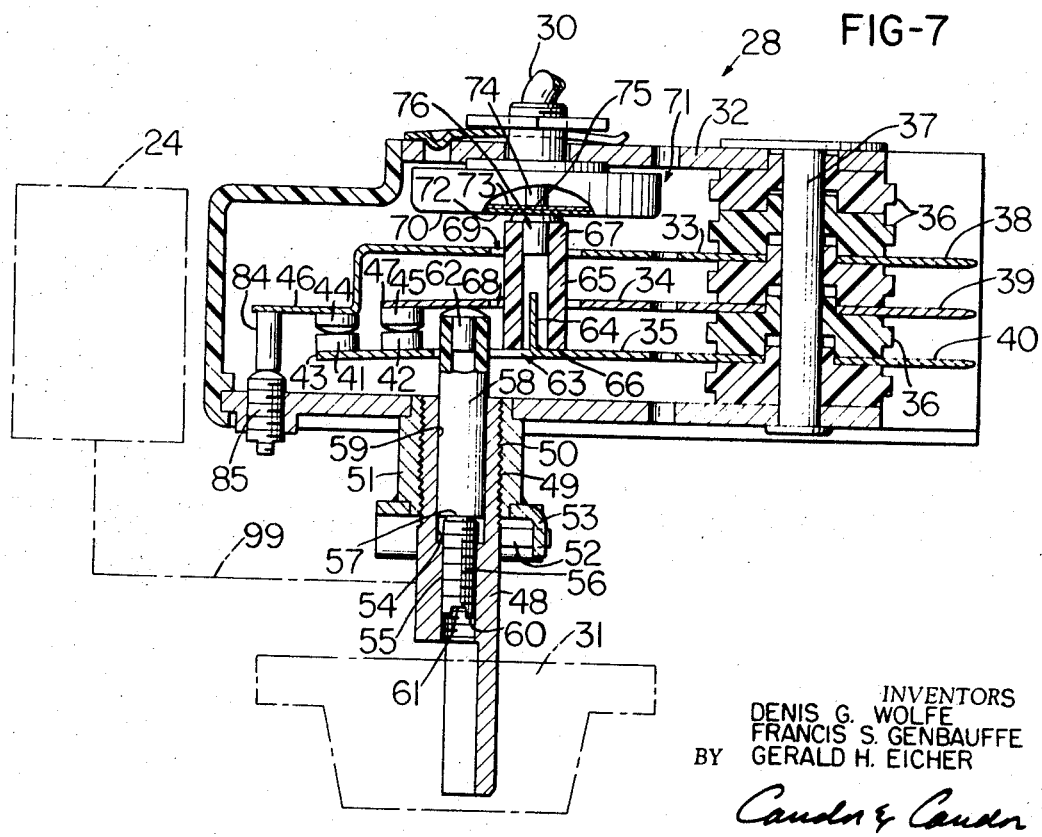

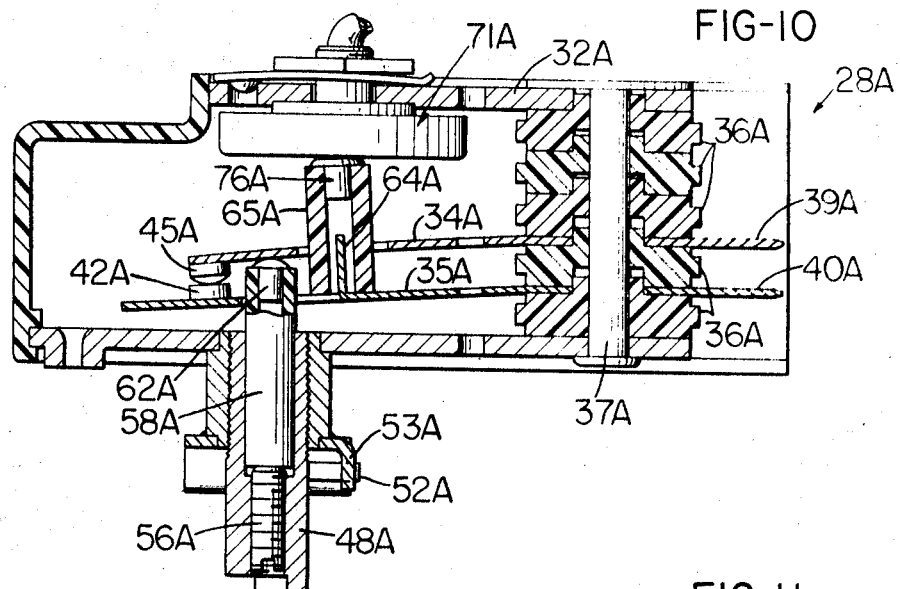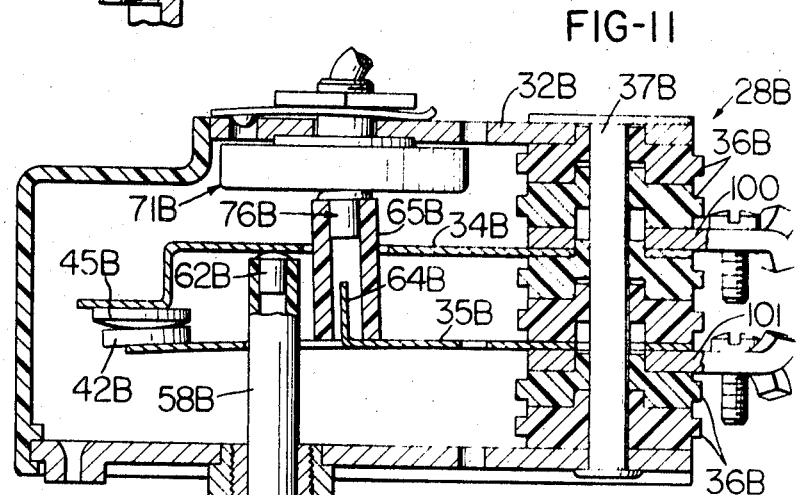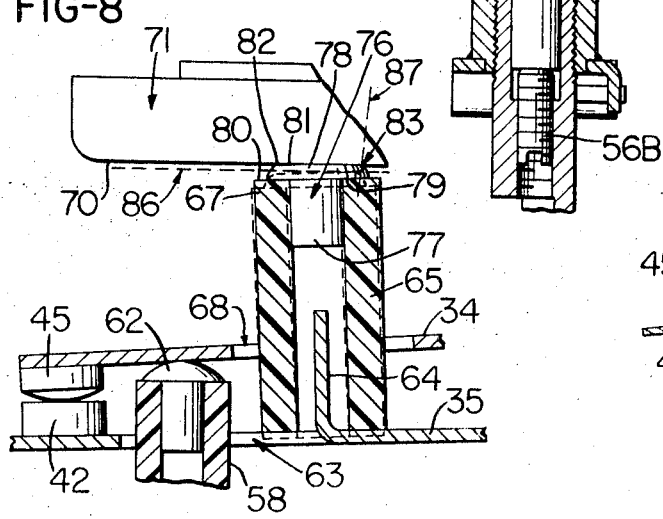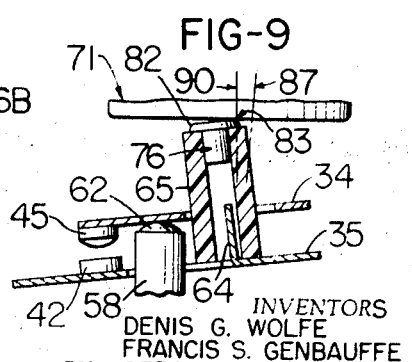

United States Patent Office 3,469,779
Patented Sept. 30, 1969

3,469,779
ELECTRICAL THERMOSTAT AND PARTS THEREFOR OR THE LIKE
Denis G. Wolfe, Greensburg, Francis S. Genbauffe, Irwin, and Gerald H. Eicher, Alverton, Pa., assignors to Robertshaw Controls Company, Richmond, Va., a corporation of Delaware
Filed Oct. 3, 1967, Ser. No. 672,603
Int. Cl. F23n 1/00, 5/02; G05d 23/02
U.S. Cl. 236—15                                    8 Claims

ABSTRACT OF THE DISCLOSURE

This disclosure relates to an electrical thermostat for a fuel control system of a domestic oven or the like wherein the electric thermostat is provided for operating a gas regulating means to control the temperature effect in the oven as selected by a manual selector means. The thermostat also has means for automatically reducing the temperature effect in the oven to a low temperature effect after the occurrence of an event, such as the lapse of a predetermined cooking time, and permits the housewife or the like to select a temperature effect below the automatic low temperature effect, even though the timer means or the like has automatically adjusted the control system to its low temperature effect setting. The thermostat includes means for creating a discrete jump in the opening of the contacts thereof to prevent arcing.

---

This invention relates to an improved electrical thermostat for a fuel burning apparatus or the like as well as to improved parts for such a thermostat or the like.

One of the features of this invention is to provide an electric thermostat that can be utilized to control an electrically operated gas regulating means to tend to maintain a temperature effect of a burner means at a preselected temperature effect selected by manually operated selector means, the selector means being only for the thermostat or also controlling a valve member for interconnecting and disconnecting a source of fuel to the electrically operated regulating means for an on-off operation thereof.

In particular, the electric thermostat of this invention controls the fuel gas supply to the burner means by means of an electrically operated heat motor valve or solenoid valve or the like.

Another feature of this invention is to permit the thermostat to be automatically modified to a lower holding temperature effect by the remote opening of a switch controlled by a clock or timer or the like wherein the housewife or the like can initially set the thermostat to maintain a relatively high cooking temperature in the oven for a preselected length of time, whereby after the lapse of such time, the thermostat will automatically reduce the temperature in the oven to a lower warmth-retaining and noncooking temperature to be maintained in the oven until the housewife or the like terminates the operation of the oven.

In addition, the housewife or the like can manually change the temperature setting of the thermostat to a temperature lower than the previously described holding temperature, even while the remote clock or timer-operated switch remains open.

Accordingly, it is an object of this invention to provide an improved thermostat having one or more of the novel features set forth above or hereinafter shown or described.

Another object of this invention is to provide improved parts for such a thermostat or the like.

Other objects, uses and advantages of this invention are apparent from a reading of this description, which proceeds with reference to the accompanying drawings forming a part thereof and wherein:

FIGURE 1 is a fragmentary, perspective view of a typical apparatus utilizing the thermostat and parts of this invention.

FIGURE 2 is a schematic view illustrating the control system of this invention in its "off" position.

FIGURE 3 is a view similar to FIGURE 2 and illustrates the system in its "on" position.

FIGURE 4 is a view similar to FIGURE 2 and illustrates the system in its "keep warm" position.

FIGURE 5 is a view similar to FIGURE 4 and illustrates the system being utilized at a temperature setting below the "keep warm" setting of FIGURE 4.

FIGURE 6 is a front view of the thermostat of this invention with the selector knob removed.

FIGURE 7 is a cross-sectional view taken on line 7—7 of FIGURE 6.

FIGURES 8 and 9 are respectively fragmentary, enlarged views similar to FIGURE 7 and illustrate the movement of various parts of the thermostat of this invention to tend to eliminate electrical arcing on the opening of the electrical contacts thereof.

FIGURES 10 and 11 are views similar to FIGURE 7 and respectively illustrate other embodiments of the thermostat of this invention.

While the various features of this invention are hereinafter described and illustrated as being particularly adaptable for providing an electrical thermostat for a domestic oven or the like, it is to be understood that the various features of this invention can be utilized singly or in any combination thereof to provide a thermostat for other types of apparatus as desired.

Therefore, this invention is not be limited to only the embodiments illustrated in the drawings, because the drawings are merely utilized to illustrate one of the wide variety of uses of this invention.

Referring now to FIGURES 1 and 2, the improved fuel control system of this invention is generally indicated by the reference numeral 20 and is being illustrated as providing a control system for a domestic range 21 having an oven chamber 22, the fuel control system 20 including a fuel supply manifold means 23 and a fuel control device 24 for interconnecting the fuel supply manifold 23 to a conduit means 25 leading to a burner means 26 for the oven 22. A continuously burning pilot burner 26' is provided for igniting the main burner means 26 and is supplied fuel from the fuel source manifold 23 by a conduit 25' that is connected to the manifold 23 upstream from the control device 24 so as not to be influenced by the operation of the device 24 as will be apparent hereinafter. The conduit 25 has a solenoid operated valve means 27 or the like disposed therein to be controlled by an electric thermostat 28 of this invention in a manner hereinafter described, the electric thermostat 28 sensing the temperature effect in the oven 22 by means of a temperature sensing bulb 29 being interconnected to the thermostat 28 by a capillary tube 30 in a manner hereinafter described.

In this manner, the housewife or the like can set a selector means 31 of the thermostat 28 at a selected temperature setting whereby the thermostat 28 will maintain the temperature effect in the oven 22 at the selected temperature effect in a manner hereinafter described, the control system 20 also having means for automatically reducing the temperature effect in the oven 22 to a lower temperature effect after the occurrence of an event, such as after the lapse of a pre-selected cooking time period, whereby the lower temperature effect may be maintained in the over 22 until the housewife or the like changes the thermostat 28 as will be apparent hereinafter.

Referring now to FIGURES 6 and 7, the electrical thermostat 28 of this invention includes a housing means 32 carrying a plurality of electrically conductive switch blades 33, 34 and 35 in spaced apart stacked relation by interposed like insulators 36 interconnected to and forming part of the housing means 31 by suitable fastening means 37, the switch blades 33, 34 and 35 respectively having right-hand terminal ends 38, 39 and 40 projecting out of the housing means 32 to be interconnected to the electrical system illustrated in FIGURES 2–5 in a manner hereinafter described.

The lower switch blade 35 carries a pair of contacts 41 and 42 on the left-hand end 43 thereof with the contacts 41 and 42 being adapted to respectively cooperate with electrical contacts 44 and 45 respectively carried on the left-hand ends 46 and 47 of the switch blades 33 and 34 in a manner hereinafter described.

The selector knob 31 for the thermostat 28 is interconnected to a control shaft 48 having an externally threaded part 49 threadedly received in the threaded bore 50 of a tubular extension 51 of the housing means 32, the control shaft 48 carrying a tang 52 extending outwardly therefrom and cooperating with a stop tang 53 on the tubular part 51 to limit rotation of the control shaft 48 in both a clockwise and counterclockwise direction as fully illustrated in FIGURE 6.

The control shaft 48 has a bore means 54 passing axially therethrough and has a reduced portion 55 thereof internally threaded to threadedly receive an adjusting member 56 having one end 57 for engagement with an actuating stem means 58 axially movable in the unthreaded part 59 of the bore means 54. The other end 60 of the threaded adjusting member 56 has a slot 61 therein to permit the threaded member 56 to be adjusted relative to the control shaft 48.

The actuating stem 58 can comprise an insulated tubular member carrying a rivet-like member 62 at the upper end thereof, the stem 58 passing through a suitable opening 63 in the switch blade 35 to have the end 62 thereof engage against the switch blade 34 intermediate its contact 45 and its terminal end 39 as illustrated in FIGURE 7.

The opening 63 in the switch blade 35 is defined at least partly by a section thereof being carved from the switch blade 35 and being bent at right angles relative thereto to define a locating tang 64. A tubular member 65 of insulating material is telescoped over the locating tang 64 of the switch blade 35 to have one end 66 thereof abut against the upper surface of the switch blade 35 in FIGURE 7 and the other end 67 thereof to project through suitable openings 68 and 69 formed in the switch blades 34 and 33 to be adapted to engage against a movable wall 70 of an expandible and contractible power element 71.

The power element 71 includes a pair of cup-shaped members 72 and 73 secured together at their outer peripheries thereof with the cup-shaped member 72 defining the movable wall 70 and the cup-shaped member 73 being secured to a conduit means 74 carried by the housing means 32 in any suitable manner and being in fluid communication therewith by an opening 75 passing therethrough so that the conduit 74 is adapted to be disposed in fluid communication with a resulting chamber defined between the cup-shaped members 72 and 73. The conduit 74 is, in turn, disposed in fluid communication with the capillary tube 30 previously described whereby the movable wall 70 of the power element 71 moves upwardly and downwardly in FIGURE 7 in response to the temperature being sensed in the oven 22 by the temperature sensing bulb 29 in a manner well known in the art.

As illustrated in FIGURES 7, 8 and 9, the end 67 of the tubular member 65 carries a rivet-like member 76 having a cylindrical part 77 projecting into the tubular member 65 and an enlarged head 78 provided with a lower surface 79 abutting against the upper flat end 80 of the tubular member 64. The rivet-like member 76 has an upper flat head 81 defining an annular arcuate corner means 82 that engages the flat end wall 70 of the power element 71 with substantially a point contact at the point 83 in FIGURES 8 and 9 to provide for a discrete and abrupt opening of the contacts 42, 45 and/or contacts 41, 44 in a manner now to be described.

The switch blade 35 has an upward normal bias to tend to maintain the rivet-like member 78 against the movable wall 70 of the power element 71. The switch blade 34 has a natural bias in a downward direction whereby the contacts 42 and 45 are respectively biased in a direction to normally place the same in electrical contact with each other.

The switch blade 33 also has a natural downward bias to tend to place the electrical contact 44 into electrical contact with the upwardly biased contact 41 on the switch blade 35. However, the end 46 of the switch blade 43 carries an extension 84, FIGURE 7, which abuts against a threaded adjusting member 85 carried by the housing member 32 to predetermine the extent of downward biasing movement of the contact 44 for a purpose later to be described.

When the control knob 31 is set to a particular temperature position thereof, the end 62 of the stem 58 is positioned relative to the housing 32 to prevent the switch blade 34 from moving downwardly beyond the end 62 of the stem 58 as the blade 34 is tending to follow the downward movement of the blade 35 under the influence of the expanding power element 71. If the temperature in the oven 22 is below the temperature selected by the knob 31 for the particular position of the stem 58, the power element 71 is in such a condition that the length of the tubular member 65 permits the upward bias force of the switch blade 35 to place the contact 42 into electrical contact with the contact 45 as illustrated in FIGURE 8.

However, as the temperature in the oven 22 reaches the selected temperature or slightly exceeds the same, the movable wall 70 of the power element 71 has been moving downwardly in FIGURE 8 from the full line position illustrated in FIGURE 8 to the dotted line position indicated generally by the reference numeral 86 and is bearing against the point 83 of the tubular member 65 to move the same downwardly therewith and slightly flex the immediate portion of the switch blade 35 downwardly therewith so that the contacts 42 and 45 remain in electrical contact with each other. However, snice the central portion of the switch blade 35 is being bowed in a downward direction, the point 83 of the rivet head 78 of the tubular member 65 makes a discrete jump or skip movement along the flat surface 70 of the expanding power element 71 from the position illustrated by the line 87 in FIGURE 9 to the position represented by the line 90 in FIGURE 9 whereby the effective length of the tubular member 65 between the power element 71 and the switch blade 35 abruptly increases to rapidly move the switch blade 35 downwardly and carry the contact 42 therewith away from the contact 45 so that arcing therebetween is reduced to a minimum or substantially eliminated by the discrete jumping or skipping of the tubular member 65 relative to the power element 71 during the expanding thereof.

Of course, such discrete jumping or skipping of the tubular member 65 operates in a like manner when separating the contacts 41 and 44 as will be apparent hereinafter.

The thermostat 28 of this invention can be utilized in the system 20 previously described and reference is now made to FIGURES 2–5 to illustrate the electrical circuit for the system 20.

In particular, it can be seen in FIGURE 2 that a power source lead L2 is adapted to be electrically interconnected to the right-hand terminal end 38 of the switchblade 33 by a lead 91 whereby the fixed contact 44 is electrically interconnected to the lead L2. A branch lead 92 interconnects the lead 91 to the right-hand terminal end 40 of the switchblade 35 to electrically interconnect the respective contacts 41 and 42 to the power source lead L2. However, the lead 92 has a clock timer operated electrical switch means 93 therein which only permits the lead L2 to be interconnected to the switchblade 35 when the timer operated switch means 93 is disposed in its normally closed position, as illustrated in FIGURE 2.

The other power source lead L1 is interconnected to one side 94 of a solenoid coil 95 of the valve means 27 in the conduit 25 by a lead 96. The other side 97 of the solenoid coil 95 is interconnected to the right-hand terminal end 39 of the switchblade 34 by a lead 98 whereby the contact 45 is electrically interconnected to the power source lead L1.

The operation of the control system 20 and the thermostat 28 will now be described.

As previously stated, the timed operated switch 93 is normally closed and when the selector knob 31 is disposed in its "off" position, as illustrated in FIGURE 2, the adjusting member or stem 58 is in its outermost axial position relative to the housing means 32 to position the contact 45 fully away from the contact 42 so that the contacts 45 and 42 cannot be placed in electrical contact with each other, regardless of the position of the movable wall part 70 of the power element 71. In this manner, the solenoid coil 95 cannot be placed across the power source leads L1 and L2, as the contacts 45 and 42 will always be in a separated condition when the thermostat is in its "off" position, even though the valve means 24 is set in a position to connect the fuel supply manifold 23 with the conduit 25.

In the "off" position of the thermostat 28, the contacts 41 and 44 are together, as illustrated in FIGURE 2. However, the valve 27 is not energized, as the contacts 42 and 45 are separated in this "off" position of the thermostat 28.

When the housewife or the like desires to operate the oven 22 with a cooking temperature, the housewife or the like rotates the selector knob 31 from its off position until the selector knob 31 is set at the desired cooking temperature, such as 325° or the like. This rotation of the selector knob 31 from its "off" position to the desired temperature setting position previously described causes axial outward movement of the adjusting member or stem 58 to move the switch blade 34 toward the switch blade 35 until the contact 45 makes contact with the contact 42 whereby the end 62 of the stem 58 can be further moved outwardly to its selected temperature setting position relative to the housing 32 as set by the knob 31.

Since the oven 22 is at a temperature below the selected temperature, such outward position of the adjusting member 58 by the selector knob 31 places the contact 45 against the contact 42 and since the upward bias of the blade 35 is greater than the downward bias of the blade 34, the stem 58 can have its end 62 moved downwardly away from the contacting blade 34.

Thus, it can be seen that in this position of the thermostat 28, the coil 95 of the solenoid operated valve member 27 is placed across the power leads L1 and L2 in the manner illustrated in FIGURE 3, because the switch 93 is closed and the contacts 45 and 42 are in electrical contact with each other. Thus, the valve member 27 opens to permit fuel to flow from the control device 24 to the burner means 26 to be ignited by suitable igniting means.

The system 20 remains in the condition illustrated in FIGURE 3 as long as the temperature effect produced by the burner means 26 is below the temperature setting of the selector knob 31. However, once the temperature in the oven 22 reaches or rises slightly above the selected temperature effect of the control knob 31, the temperature sensing bulb 29 has caused the power element 71 to expand in such a manner that the movable wall part 70 has moved downwardly in FIGURE 7 a distance sufficient to carry the spring blade 35 therewith with the natural bias of blade 34 causing the same to follow such downward movement of the blade 35 until the blade 34 abuts the end 62 of the stem 58 to cause the contact 42 to separate from the contact 45 to terminate the flow of current through the coil 95 so that the valve means 27 will close and terminate the flow of fuel to the burner means 26.

When the temperature effect in the oven 22 falls below the selected temperature effect of the knob 31, the temperature sensing bulb 29 has caused the movable wall part 70 of the power element 71 in FIGURE 7 to move upwardly a distance sufficient to again place the contact 42 into electrical contact with the contact 45 and again energize the coil 95 to open the valve means 27 and permit fuel to flow to the burner means 26.

Thus, it can be seen that the thermostat means 28 of this invention is adapted to cycle on and off the burner means 26 of the oven 22 to tend to maintain the temperature effect in the oven 22 at the temperature selected by the selector knob 31.

If the housewife or the like had set the timer-operated switch means 93 to open the switch 93 after the lapse of a pre-determined cooking time, such as two hours or the like, the thermostat means 28 of the control system 20 would maintain the temperature effect in the oven 22 at the previously described 325° F., as set by the selector knob 31 for this two-hour period in the manner previously described. However, when the two-hour cooking period lapsed, the timer-operated switch 93 will automatically open in the manner illustrated in FIGURE 4 to prevent the solenoid-operated valve 27 from having its coil 95 energized through the closing of the contacts 45 and 42. Thus, the temperature effect in the oven 22 decreases, causing the movable wall part 70 of the power element 71 to move upwardly and the switchblades 34 and 35 to follow therewith as the upward bias of blade 35 is greater than blade 34.

Such upward movement of the switchblades 35 and 34 continues until the switchblade 34 places the contact 41 thereof into electrical contact with the contact 44 in the manner illustrated in FIGURE 4, whereby it can seen that the solenoid coil 95 is now placed across the power source leads L1 and L2 by the closed contacts 41 and 44, even though the timer-operated switch means 93 is in its open condition, because the blades 34 and 33 are always interconnected respectively to power leads L1 and L2.

Thus, fuel is again supplied to the burner means 26 by the now energized valve means 27 to tend to maintain the temperature effect in the oven 22 at a warmth-retaining and non-cooking temperature as previously set by the adjusting screw 85. In particular, the temperature sensing bulb 29 will cause the power element 71 to separate the contacts 41 and 44 when the temperature effect in the oven 22 rises above the "keep warm" temperature setting of the screw 85 and will place the contacts 41 and 44 in electrical contact when the temperature effect in the oven 22 falls below the "keep warm" temperature.

Thus, the control system 20 of this invention, through the thermostat 28, will maintain the temperature effect of the oven 22 at its "keep warm" temperature until the housewife or the like turns the selector knob 31 to its "off" position, as illustrated in FIGURE 2.

However, should the control system 20 be in the "keep warm" condition illustrated in FIGURE 4 wherein the timer-operated switch 93 is in its "open" position and the housewife or the like desires to have the temperature effect in the oven 22 be maintained by the thermostat 28 at a temperature below the automatic "keep-warm" temperature, as set by the adjusting screw 85, the housewife can turn the selector knob 31 to such lower temperature to reposition the end 62 thereof upwardly from the position illustrated in FIGURE 4 to the position illustrated in FIGURE 5, whereby the temperature in the oven 22 will have to decrease to the lower temperature selected by the knob 31 in order to place the contact 42 into electrical contact with the contact 45 and complete the circuit across the coil 95 of the valve means 27.

Thus, the temperature sensing bulb 29 will cause the power element 71 to open and close the contacts 45 and 42 to tend to maintain the temperature effect in the oven 22 at the low temperature setting set by the control knob 31 even though the switch means 93 is in its "open" position.

Accordingly, it can be seen that not only does this invention provide an improved electrical thermostat for a cooking apparatus or the like, but also this invention provides improved parts for such a thermostat or the like.

While the electrical thermostat 28 of this invention has been illustrated as being separately operated from the control valve means 24 of FIGURE 1, it is to be understood that the thermostat 28 and control valve means 24 could be operatively interconnected together so that when the selector knob 31 is moved to an "on" position thereof, such movement of the selector knob means 31 would open the valve means 24 to interconnect the supply manifold 23 to the conduit 25.

For example, as illustrated in FIGURE 7, the control shaft 48 is interconnected to the control device 24 by suitable interconnection means 99 whereby the control valve 24 will be opened when the control knob 31 is moved to an "on" position and will be closed only when the control knob 31 is moved to an "off" position.

It should also be understood that the various parts of the thermostat 28 of this invention readily lend themselves to full automatic assembly operations as well as to being readily utilized to form other types of electrical thermostats than the one utiized in the system 20 previously described.

For example, reference is now made to FIGURE 10 of the drawings wherein another electrical thermostat of this invention is generally indicated by the reference numeral 28A and parts thereof similar to the thermostat 28 are indicated by like reference numerals followed by the reference letter A.

As illustrated in FIGURE 10, the thermostat 28A only utilizes the switch blades 34A and 35A as the switch blade 33 of the thermostat 28 has been eliminated and the contact 41 need not be on the switch blade 35A whereby the thermostat 28A can provide a normal cooking operation for an oven in the manner previously described for the contacts 45 and 42 without the "keep warm" feature of the thermostat 28.

Another thermostat device is generally indicated by the reference numeral 28B in FIGURE 11 and parts thereof similar to the thermostat 28 are indicated by like reference numerals followed by the reference letter B.

As illustrated in FIGURE 11, the various parts of the thermostat device 28B are substantially the same as the thermostat 28, except that different style electrical switch blades 34B and 35B are provided and the housing means 32B is slightly enlarged by utilizing more insulator means 36B. In addition, terminal elements 100 and 101 are inserted in the insulating stack 36B to be respectively electrically interconnected to the switch blades 34B and 35B by the stacked arrangement.

Thus, by merely increasing the size of the various housing parts and shaft parts, it can be seen that all of the features of the thermostat of this invention can be utilized in any of the thermostat structures 28, 28A or 28B to produce the novel and unobvious effects previously described.

While the form of the invention now preferred has been disclosed as required by the statutes, other forms may be used, all coming within the scope of the claims which follows.

What is claimed is:

1. In combination, a source of fuel, a burner means, passage defining means interconnecting said source of fuel to said burner means, electrically operated valve means in said passage defining means between said source and said burner means, and an electric thermostat for operating said electrically operated valve means in response to the temperature effect of said burner means to tend to maintain said temperature effect at a temperature setting of said thermostat, said thermostat having a manually operated selector means selecting said temperature setting of said thermostat, said thermostat having a temperature sensing means provided with a part movable in response to changes in said temperature effect of said burner means, said thermostat having two switch blades cooperating together to operate said valve means, said selector means engaging one of said blades and said movable part of said temperature sensing means being operatively engagable with said other blade by a post means disposed between said movable part and said other blade, said one blade having an opening passing therethrough and receiving said post means.

2. A combination as set forth in claim 1 wherein said thermostat includes means for changing said temperature effect to a predetermined temperature effect after the occurrence of an event.

3. A combination as set forth in claim 2 wherein said last-named means changes said temperature effect to said predetermined temperature effect without changing the position of said manually operated selector means.

4. A combination as set forth in claim 1 wherein said thermostat includes a first electrical contact carried by said one blade and a second electrical contact carried by said second blade, said second contact being positioned relative to said first contact in response to movement of said movable part of said temperature sensing means, said first contact being normally positioned relative to said second contact by movement of said selector means to a desired temperature setting thereof whereby said contacts are placed into contact with each other by said movable part when said temperature sensing means senses a temperature effect below said selected temperature setting and moves said second contact out of contact with said first contact when said temperature sensing means senses a temperature effect above said selected temperature setting.

5. A combination as set forth in claim 4 wherein said thermostat includes a fourth contact and a fifth contact, said fifth contact being positioned relative to said fourth contact by said movable part of said temperature sensing means.

6. A combination as set forth in claim 5 and including means for adjusting one operating position of said fourth contact relative to said fifth contact.

7. A combination as set forth in claim 4 wherein said post means cooperates with said movable part and said other blade to provide abrupt opening of said first and second contacts.

8. A combination as set forth in claim 7 wherein said post means has an end that is engageable with said movable part and provides a sidewise skipping relation therewith to cause said abrupt opening of said first and second contacts.

References Cited

UNITED STATES PATENTS

| | | | |
|---|---|---|---|
| 2,885,151 | 5/1959 | Weber | 236—75 |
| 3,193,200 | 7/1965 | Willson | 236—46 |

WILLIAM E. WAYNE, Primary Examiner

U.S. Cl. X.R.

236—46, 68; 337—323